United States Patent
Araki et al.

[19]

[11] Patent Number: 6,142,643
[45] Date of Patent: *Nov. 7, 2000

[54] ELECTROLUMINESCENT RETROREFLECTIVE ARTICLE

[75] Inventors: Yoshinori Araki; Hidetoshi Abe, both of Tendo, Japan

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/966,146

[22] Filed: Nov. 7, 1997

[30] Foreign Application Priority Data

Nov. 8, 1996 [JP] Japan ................................. 8-296287

[51] Int. Cl.⁷ .................................................. H05B 33/00
[52] U.S. Cl. .......................... 362/84; 362/267; 313/498; 40/544; 40/582
[58] Field of Search ........................ 362/84, 267; 40/544, 40/582, 583; 313/498, 502–505, 509–512, 113, 114

[56] References Cited

U.S. PATENT DOCUMENTS

| | | | |
|---|---|---|---|
| 3,684,348 | 8/1972 | Rowland | 350/103 |
| 4,025,159 | 5/1977 | McGrath | 350/156 |
| 4,588,258 | 5/1986 | Hoopman | 350/350 |
| 4,775,219 | 10/1988 | Appeldorn et al. | 350/350 |
| 4,895,428 | 1/1990 | Nelson et al. | 350/350 |
| 4,938,563 | 7/1990 | Nelson et al. | 350/350 |
| 4,952,023 | 8/1990 | Bradshaw et al. | 350/350 |
| 5,156,885 | 10/1992 | Budd | 427/427 |
| 5,237,448 | 8/1993 | Spencer et al. | 119/250 |
| 5,243,457 | 9/1993 | Spencer | 119/250 |
| 5,300,783 | 4/1994 | Spencer et al. | 250/359 |
| 5,315,491 | 5/1994 | Spencer et al. | 362/84 |
| 5,415,911 | 5/1995 | Zampa et al. | 428/359 |
| 5,620,348 | 4/1997 | Santana et al. | 445/24 |
| 5,775,016 | 7/1998 | Chien | 40/544 |

FOREIGN PATENT DOCUMENTS 0 661 494 A1  7/1995  European Pat. Off. .

*Primary Examiner*—Alan Cariaso
*Assistant Examiner*—Ronald E. DelGizzi
*Attorney, Agent, or Firm*—Doreen S. L. Gwin

[57] ABSTRACT

Electroluminescent retroreflective article comprising: (a) a retroreflective member comprising (1) a cube corner member having a front surface and a back surface, the back surface having a plurality of cube corner elements protruding therefrom and (2) a seal film bonded to the back surface having a first surface oriented toward the cube corner elements and a second surface oriented away from the cube corner elements; and (b) an electroluminescent element bonded to the second surface of the seal film such that the electroluminescent element emits light incident to the seal film.

4 Claims, 1 Drawing Sheet

ELECTROLUMINESCENT RETROREFLECTIVE ARTICLE

FIELD OF INVENTION

The present invention relates to articles that are electroluminescent and retroreflective.

BACKGROUND

Retroreflective articles, i.e., articles that return a substantial portion of incident light generally back toward the source, are used widely to make signs that are more visible, e.g., to motorists in approaching vehicles. Perhaps the two most common types of retroreflective materials are microsphere-based products and cube corner type products. Cube corner type products typically can provide brighter retroreflective effect than do microsphere-based materials.

The utility of retroreflective signs is typically limited somewhat to those with an effective light source, e.g., motorists in vehicles. Retroreflective signs are often of less utility to those without an effective light source, e.g., pedestrians, persons in vehicles with malfunctioning headlights, etc. As a result, it is known to provide additional light sources, external illumination such as street lights or internal illumination to improve the visibility of signs having retroreflective portions on the face thereof.

U.S. Pat. No. 4,952,023 (Bradshaw et al.) discloses an internally illuminated sign employing retroreflective sheeting with transmissive bonds. Although very effective, such signs may be unduly bulky for some applications.

Another approach is to use what is sometimes referred to as self-luminous retroreflective articles, e.g., articles that both retroreflect incident light as well as emit light in the same directions.

U.S. Pat. Nos. 5,237,448; 5,243,457; 5,300,783; and 5,315,491 (all Spencer et al.) disclose self-luminescent retroreflective articles. These articles do not provide desired performance.

U.S. Pat. No. 5,415,911 (Zampa et al.) discloses photoluminescent retroreflective sheeting. Such sheetings are not as bright as is desired for some applications.

The need exists for self-luminescent retroreflective sheeting that is brighter and lighter than previously known self-luminescent sheetings.

SUMMARY OF INVENTION

The present invention provides an electroluminescent retroreflective article and an electroluminescent retroreflective sign.

In brief summary, articles of the invention comprise (a) a retroreflective member comprising (1) a cube corner member having a front surface and a back surface, the back surface having a plurality of cube corner elements protruding therefrom and (2) a seal film bonded to the back surface of the cube corner member so as to form a plurality of sealed cells in which the cube corner elements have air interfaces, the seal film having a first surface oriented toward the cube corner elements and a second surface oriented away from the cube corner elements; and (b) an electroluminescent element bonded to the second surface of the seal film such that the electroluminescent element emits light incident to the seal film.

Articles of the invention provide exceptional visibility at night, providing both retroreflective effect and self-luminence. As a result, articles incorporating them such as road signs can provide improved effectiveness and enhancing safety.

As used herein, whole light transmission is measured using JIS K-7105.

BRIEF DESCRIPTION OF DRAWING

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
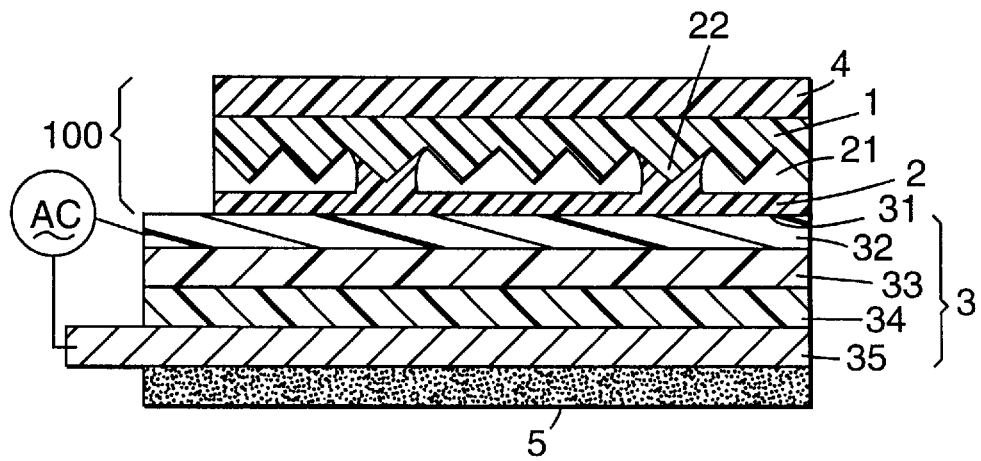
FIGS. 1 and 2 are each a cross-section of an illustrative embodiment of an electroluminescent retroreflective article of the invention.

An illustrative embodiment of the invention is shown in FIG. 1 wherein is shown an electroluminescent retroreflective article comprising (a) retroreflective member 100 comprising cube corner member 1 having a front surface and a back surface, the back surface having a plurality of cube corner elements protruding therefrom and seal film 2 bonded to the back surface having a first or front surface oriented toward the cube corner elements and a second or rear surface oriented away from the cube corner elements, and optional cover layer 4; and (b) electroluminescent element 3 bonded to the second surface of seal film 2. The article further comprises optional application adhesive 5 on the back side thereof. Seal film 2 is sealed to front member 1 along a network of bonds 22 leaving cells 21 of cube corner elements with air interfaces. Electroluminescent member 3 is made up of front electrode 32, light-emitting layer 33, insulating layer 34, and back electrode 35. In the embodiment show, electroluminescent member 3 is adhered directly to back side 31 of seal film 2. The adjective front is used herein to refer to the side or surface oriented toward observers and the adjectives rear and back are used synonymously to refer to the opposing side or surface.

Figure 2:
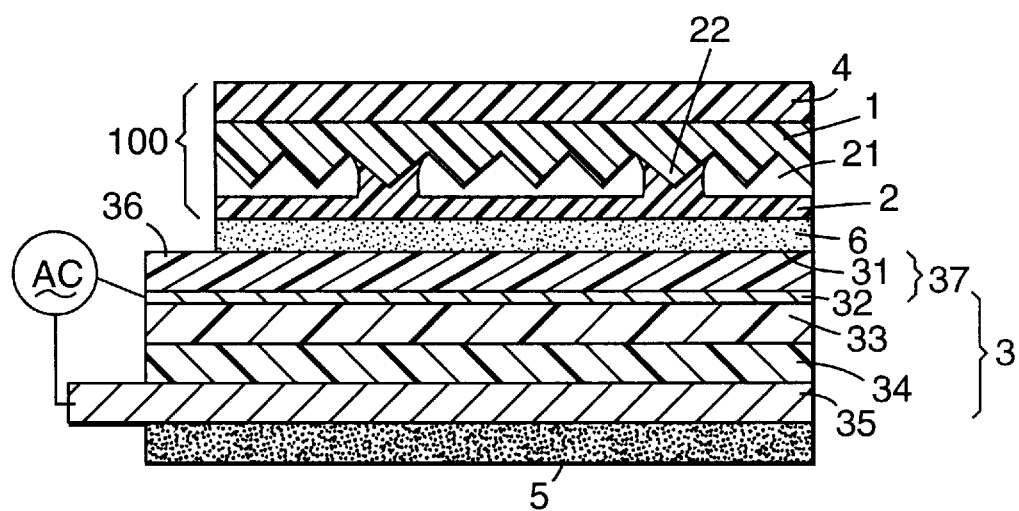

Another embodiment of the invention is shown in FIG. 2 where like numerals represent corresponding components and features. In this embodiment, front electrode 37 further comprises transparent film 36 and electroluminescent member 3 is adhered to back side 31 of seal film 2 with intermediate adhesive 6.

The retroreflective member is typically polymeric, being a material that has a whole light transmission of at least 70 percent, preferably at least 80 percent, more preferably at least 90 percent.

The front surface is typically substantially flat and the back surface has a plurality of cube corner elements protruding or projecting therefrom.

The cube corner elements may each be a protrusion or projection having a single cube corner formed by the intersection of three intersecting surfaces, e.g., such as is disclosed in U.S. Pat. No. 4,588,258 (Hoopman), U.S. Pat. No. 4,775,219 (Appeldorn et al.), or U.S. Pat. No. 4,895,428 (Nelson et al.), or each protrusion or projection may possess more than one cube corner element, e.g., such as is disclosed in U.S. Pat. No. 4,938,563 (Nelson et al.). A number of different cube corner elements have been utilized or described to achieve different optical effect, e.g., increased retroreflective brightness at high or low entrance angles. One skilled in the art can readily select a suitable type of cube corner element to provide the specific retroreflective performance desired of the resultant article. If desired, the article may utilize two or more types of cube corner elements to achieve special effects.

A preferred cube corner type is an array of triagonal pyramids having base edges about 0.1 to about 3.0 millimeters in length which are about 25 to about 500 microns in height.

The cube corner member is typically made of one or more polymers and may be a single layer or multilayer. Illustrative examples of suitable polymers include acrylics, epoxy-modified acrylics, polycarbonates, etc. The front member is typically preferably highly transparent and typically has a refractive index between about 1.4 and 1.7.

An optional cover layer may be provided on the front surface of the cube corner member to impart such desired properties as abrasion resistance, receptivity for printing inks or other imaging media used to form graphic indicia on the front of the article, ultraviolet screen, etc.

The seal film is typically between about 10 and 1000 microns thick, typically has a softening point in the range of 80° C. to 180° C., and typically has a whole light transmission of at least 20 percent, preferably at least 30 percent.

When the seal film is used as a light diffusing element, its whole light transmission is preferably between about 20 and 80 percent, more preferably between about 25 and about 75 percent.

When optimum self-luminescent brightness of the article is desired, the whole light transmission of the seal film is preferably at least 80 percent, more preferably at least 90 percent.

The seal film can be produced by any suitable technique, extrusion is often preferred.

Illustrative examples of polymers which can be used to make the seal film include polyesters, acrylics, polyurethanes, vinyl chlorides, polycarbonates, polyamides, polyvinyl fluorides, polybutyrates, and the like.

The seal film is sealed to the cube corner member under heat and pressure, typically applied in a pattern of intersecting bonds. An illustrative method of choice of materials is disclosed in U.S. Pat. No. 4,025,159 (McGrath). The seal film is laminated to the cube corner member at a temperature higher than the softening temperature of the seal film, typically preferably between about 100 and about 300° C.

The seal film is typically sealed to the cube corner member in a pattern of intersecting bonds defining a plurality of minute cells. Typically it is preferred that the area of a cell be between about 2.5 and about 40 square millimeters (mm$^2$), preferably between about 5 and about 30 mm$^2$. When the area of a cell is less than about 2.5 mm$^2$, resultant retroreflective brightness may be lower than desired. When the area of a cell is greater than about 40 mm$^2$, the resultant sheeting tends to be subject to greater damage upon impact and flexing, more likely to wrinkle, and the cube corner member may be more easily broken or damaged.

The areas at which the seal film is sealed to the cube corner member are optically transmissive such that light rays emitted by the electroluminescent member are transmitted through the seal film and cube corner member to be emitted from the front face of the article. Such constructions are known to those skilled in the art. For example, the aforementioned U.S. Pat. No. 4,952,023 (Bradshaw et al.) discloses such form of cube corner member and seal layer and is incorporated herein in reference in its entirety.

The total area of the face of the sheeting that is made up of seal legs is typically between about 10 and 85 percent, preferably between about 20 and 70 percent, more preferably between about 30 and 60 percent. When the area is above 85 percent, the resultant retroreflective brightness is reduced undesirably. When it is less than 10 percent, the strength of the bond to the cube corner member is typically too low, such that the resultant sheeting is subject to delamination of the seal film from the cube corner member.

In cases where the seal film is a semitransparent or translucent film having diffusion properties, the total seal leg area is typically not above 70 percent.

The electroluminescent member ("EL member") is attached to the back side of the seal film in such a way that the EL member emits light which is transmitted through the seal film and through the cube corner member so as to be visible from the front of the resultant article. Preferably the EL member emits visible light in a brightness of at least 13 candela/square meter (cd/m$^2$).

As discussed above, with reference to FIG. 1, EL member 3 typically comprises, in order, transparent conducting layer 32 (sometimes referred to as the front electrode), light-emitting layer 33, insulating layer 34, and back electrode 35.

As shown in FIG. 2, EL member 3 may further comprise transparent film 36, e.g., on the front side of the front electrode. Typically a polymeric film of high transparency it can be used to form a more conveniently used or more robust front electrode. Illustrative examples of polymeric materials that can be used to form such a film include films of acrylics, blends of acrylic and fluororesins, polyesters, polycarbonates, etc. The film surface is preferably treated to impart desired adhesion properties to the seal film or intermediate adhesive and to the transparent conductive layer. Several commercial transparent conductive films comprising a transparent film with a surface coated with a transparent conductive layer are available and suitable for use in this invention.

In some embodiments, the EL member is adhered directly to the seal film. For example, the seal film and front layer of the EL member comprise compatible polymers. In other embodiments, the EL member is adhered to the seal film with an intermediate adhesive layer. This adhesive layer should provide desired adhesion to both adherends, withstand conditions under which the resultant article is expected to be used, and be highly transparent such that much of the light emitted by the EL member will be emitted form the front of the article. Illustrative examples of suitable adhesives include acrylic adhesives synthesized by solution polymerization or ultraviolet radiation polymerization, hot melt adhesives, pressure sensitive adhesives, thermally activated adhesives, etc.

The transparent conductive film is preferably made of an indium-tin oxide (In2O3—SnO2) mixture which has a low specific resistance of about $10^{-4}$ Ω•cm. The conductive layer can be formed by any suitable means. For example, it can be formed by directly applying the ITO film on the seal film by vacuum deposition or sputtering, or by dispersing ITO pigment in a transparent resin to yield a coating composition that can be applied to the seal film to form the desired layer, etc.

The surface resistivity of the transparent conductive layer is preferably about 500 Ω/cm$^2$ or less.

The light-emitting layer preferably comprises a polymeric material or matrix resin having a high dielectric constant in which a light-emitting electroluminescent material has been dispersed.

Illustrative examples of suitable polymeric materials include cyanoethylcellulose and fluororesins. Other suitable polymers can be readily selected by those skilled in the art.

A preferred example of suitable a light-emitting electroluminescent material is zinc sulfide doped with copper or manganese. Those skilled in the art will be able to readily select suitable electroluminescent material, taking into consideration such as factors as conditions of humidity, temperature, sun exposure, etc. in which the final article will be used, desired color of light emission, available power sources, etc.

The particles of light-emitting electroluminescent material may be coated, e.g., with a transparent oxide film, to improve the durability and resistance to humidity thereof. For example, U.S. Pat. No. 5,156,885 (Budd) discloses encapsulated phosphors that would be useful in articles of the invention.

The EL material may be selected to emit the desired color, e.g., white, red, blue, green, blue-green, orange, etc. Two or more different EL materials may be used in combination to generate the desired color. The materials may be dispersed throughout a single layer, or two or more layers may be overlaid upon one another.

The amount of electroluminescent material in the light emitting layer is dependent in part upon the brightness of emission that is desired and inherent brightness of the EL material. Typically the layer will contain between about 50 and about 200 parts by weight of EL material per 100 parts by weight of the matrix resin.

The insulating layer is typically made of a polymeric material having a high dielectric constant, e.g., cyanoethylcellulose or fluororesins in which a pigment (e.g., $PbTiO_3$, $BaTiO_3$, $SrTiO_3$, $Y2O_3$, $TiO_2$, $SiO_2$, $Al_2O_3$, etc.) having a high dielectric constant is uniformly dispersed.

The pigment loading is typically preferably between about 30 and about 100 parts by weight per 100 parts by weight of resin. If the loading is too low, resultant insulation properties may be too low. If the loading is too high, it may be difficult to uniformly disperse the pigment, yielding a film that has a rough surface.

Illustrative examples of suitable polymers include acrylics, blends of acrylic and fluororesins, polyesters, polycarbonates, etc.

The back electrode can be formed from any suitable electrically conductive material. Illustrative examples include metals such as aluminum and magnesium which can be easily laminated by vacuum deposition. Another example is carbon paste which can be laminated as a preformed film or by coating or applying, e.g., screen printing.

The EL device emits light when an electric current is applied to the element by connecting a power source to two terminals which are bonded to the transparent conductive layer and the back electrode. The electric current may be a direct or alternating current and typically has a voltage of between about 3 and about 200 volts, and in the case of alternating current, typically has a frequency of between about 50 and about 1000 Hertz. Illustrative direct current power sources include, dry cells, wet cells, battery cells, solar cells, etc. Alternating current can be applied through an invertor which changes the voltage or frequency of the alternating current or converts the current between direct and alternating current.

The article typically further comprises an optional application adhesive on the back side of the article, e.g., on the back side of the back electrode layer. This adhesive is used to bond the article to a desired substrate, e.g., a metal panel, building surface, etc. A suitable adhesive can be readily selected by one skilled in the art, considering such factors as the environment to which the article will be exposed and used, e.g., temperature extremes, temperature cycles, humidity extremes, and cycles, length of use, condition of application, etc. Many suitable acrylic adhesives are well known for providing excellent durability in adhesion to aluminum substrates and outdoor use.

Articles of the invention can provide effective retroreflection and self-illumination properties across their surface. They can be made in thin forms that are easily applied to substrates and existing surfaces to provide signs. They can be made in flexible form. In a common use graphic indicia in desired form, e.g., a STOP legend, will be mounted, adhered, printed, painted, or otherwise applied to the front surface of the article.

Further details of the invention are defined in the features of the claims.

EXAMPLES

The invention will be further explained by the following illustrative examples which are intended to be non-limiting. Unless otherwise indicated, all amounts are expressed in parts by weight.

Unless otherwise indicated, the following test methods and approaches were used to evaluate the sheetings.
Thickness:
Thickness of the electroluminescent retroreflective sheetings were measured after removal of the release liner.
Reflectance Y (Whiteness):
Reflectance Y, a measurement of whiteness, was measured when the electroluminescent layer was not activated with a Σ80 (from Nippon Denshoku Kogyo) using D65 light source at a view angle of 10°.
Retroreflective Brightness:
Retroreflective brightness of the sheeting was measured when the electroluminescent layer was not activated using a Gamma Scientific Model 920 Spectrophotometer.
Self-Luminence:
Self luminescence of the article and of the EL member alone was measured in a dark room by applying an alternating current (120 V, 600 Hz) using a PC 500L Invertor (from Kikusui Company) to activate the sheeting and brightness was measured using a MINOLTA™ LS-110 Light Meter (from Minolta Corporation), with the distance between the light meter and the sheeting being 1 meter.
Visibility:
Was measured in the same way retroreflective brightness was except an alternating current was applied as in the Self-Luminence Test.
Day/Night Appearance:
A legend was printed on the front surface of the sheeting using red ink for traffic signs. The Day/Night Appearance was rated as OK if the color and visibility of the legend was readily visible and unchanged under daytime conditions (ambient light as well as self-luminescence activated as in Self-Luminence Test), under nighttime conditions (dark ambient conditions) with the face illuminated by vehicle headlights and the self-luminence not activated, with the face illuminated by vehicle headlights and the sheet self-luminence activated as in the Self-Luminence Test, and with the sheet self-luminence activated as in the Self-Luminence Test with no headlights.

Example 1

A seal film (white polyester film having a whole light transmission of 46.5 percent) was placed on the back surface of a cube corner sheeting (polycarbonate, having a whole light transmission from the back surface of 100 percent) and heat embossed to the cube corner member by passing between a flat roll and an embossing roll at a pressure of 4.2 kg/cm$^2$ and an embossing roll temperature of about 260° C.

The seal pattern was an array of substantially uniform squares each having an area of about 10 mm$^2$. The total area of the seal legs was about 38 percent.

A top film (colorless transparent film of impact resistant polymethyl methacrylate) was fusion bonded to the front surface of the cube corner member to yield the coated cube corner member.

An ITO transparent conductive paste (SC-109 from Tohoku Kako) was knife coated over the back surface of the seal film at a bar setting of 100 microns and dried at 85° C. for 3 minutes to form a transparent conductive layer.

Twenty three parts of Type 830 Phosphor from Osram Sylvania Company (an electroluminescent phosphor which provides a white fluorescence under an applied electric field and that is believed to contain copper/manganese-activated zinc sulfide and copper-activated zinc sulfide) was uniformly dispersed in 100 parts of solvent (toluene and methanol in 4:1 weight ratio) containing 23 parts of cyanoethyl-cellulose resin. The composition was knife coated over the transparent conductive layer at a bar setting of 80 microns and dried. This cycle was repeated once more to yield the light-emitting layer.

Twelve parts of titanium dioxide (TAIPKE™ CR-90 from Ishara Industries) was uniformly dispersed in 100 parts of solvent (toluene and methanol in 4:1 weight ratio) containing 23 parts of cyanoethyl-cellulose resin. The composition was knife coated over the light-emitting layer at a bar setting of 100 microns and dried at 85° C. for 2 minutes. This cycle was repeated once more to yield the insulating layer.

Aluminum was then vapor deposited on the back side of the insulating layer in a vacuum of about $5\times10^{-6}$ Torr to form the back electrode.

A liquid comprising 100 parts of an acrylic tackifier (SK 1310 from Soken Chemical Company) and 1.5 parts of an isocyanate crosslinking agent was coated on a silicone-coated release liner and dried. It was then laminated to the back side of the back electrode to act as the application adhesive.

The resultant retroreflective sheet was cut in the size and shape of an aluminum substrate for a traffic sign (an equilateral triangle having sides of about 533 millimeters in length and corners rounded at a radius of curvature of about 33 millimeters), terminals bonded to the transparent conductive layer and the back electrode, and the release liner removed. The retroreflective sheet was then adhered to an aluminum sign panel using the application adhesive.

A thumb nail was applied to the edge of the cut sheeting and a force applied attempting to peel the retroreflective element from the seal film, but the two were not separated.

The results obtained are shown in the Table 1 below.

Example 2

A seal film (white polyester film having a whole light transmission of 90.3 percent) was placed on the back surface of a cube corner sheeting (polycarbonate, having a whole light transmission from the back surface of 100 percent) and heat embossed to the cube corner member by passing between a flat roll and an embossing roll.

The seal pattern was an array of substantially uniform squares each having an area of about 9 mm$^2$. The total area of the seal legs was about 46 percent.

A top film was fusion bonded to the front surface of the cube corner member as in Example 1. The whole light transmission from the back side to the front side was 85.7 percent.

A liquid comprising 100 parts of an acrylic tackifier (SK 1310) and 1.5 parts of an isocyanate crosslinking agent was coated on a silicone-coated release liner and dried, and then applied to the back of the seal film to provide an intermediate adhesive layer. This product is referred to as Intermediate A.

Separately, the same composition as used in Example 1 to form the light-emitting layer was knife coated onto a transparent conductive film (TETLIGHT™ TCF from Oike Industries) in two cycles as in Example 1. After drying this procedure was repeated to yield a light-emitting layer/transparent conductive layer composite.

The insulating layer, back electrode, and adhesive layer were formed on the light-emitting layer in the same manner as in Example 1 to form what is referred to as Intermediate B.

The release paper was removed from Intermediate A and Intermediate A adhered to the front side of Intermediate B.

The resultant sheeting was cut, terminals bonded thereto, and applied to a substrate as in Example 1.

A thumb nail was applied to the edge of the cut sheeting and a force applied attempting to peel the retroreflective element from the seal film, but the two were not separated.

The results obtained are shown in the Table 1 below.

Example 3

A self-luminescent retroreflective sheeting was formed as in Example 2, except Intermediate A was made using the retroreflective element like that in Example 1 and a white-emitting electroluminescent element LUMISHEET™ WH (from Kabushikikaisha Seikosha, believed to contain a mixture of blue-green emitting phosphor and red dye) was used in place of Intermediate B.

The results obtained are shown in the Table 1 below.

Also, the wide angle retroreflective properties of the resultant sheeting are illustrated in Table 2 (EL not activated) and Table 3 (EL activated), measured as described in JIS Z 9117 for indicated incidence and observation angles. Incidence Angle is the angle between a reference axis perpendicular to the surface and the axis from the light source to the surface (Incidence Axis) and Observation Angle (sometimes referred to as View Angle) is the angle between the Incidence Axis and the axis from the surface to the observer (the Observation Axis). From these results it can be seen that self-luminence capabilities of articles of the invention can improve the visibility and hence utility of retroreflective articles such as signs at high incidence angles and high observation angles.

Example 4

An article of the invention was made as in Example 2 except a white-emitting electroluminescent element LUMISHEET™ WH was used in place of Intermediate B.

The results obtained with this article are show in Tables 1–3.

TABLE 1

| Example No. | 1 | 2 | 3 | 4 |
|---|---|---|---|---|
| Thickness (microns) | 437 | 725 | 617 | 695 |
| Reflectance Y (%) | 46.85 | 43.79 | 40.50 | 36.31 |
| Retroreflective brightness (cd/lux/m$^2$) | 462 | 1187 | 480 | 895 |

TABLE 1-continued

| Example No. | 1 | 2 | 3 | 4 |
|---|---|---|---|---|
| Self-Luminance-Article (cd/m$^2$) | 4.84 | 5.53 | 43.9 | 59.3 |
| Self-Luminance-EL Member (cd/m$^2$) | — | 13.23 | 112.7 | 113.8 |
| Visibility(cd/lux/m$^2$) | 465 | 1191 | 540 | 986 |
| Day/Night Appearance | OK | OK | OK | OK |

TABLE 2

| Example | Incident Angle | View angle of 0.5° | View angle of 1.0° | View angle of 2.0° |
|---|---|---|---|---|
| 3 | 5° | 301 | 92.0 | 10.8 |
|  | 25° | 135 | 46.0 | 8.12 |
|  | 45° | 70.4 | 29.7 | 10.8 |
|  | 65° | 18.9 | 13.5 | 5.41 |
| 4 | 5° | 388 | 39.6 | 2.83 |
|  | 25° | 272 | 45.2 | 2.83 |
|  | 45° | 153 | 53.7 | 2.83 |
|  | 65° | 33.9 | 22.6 | 5.66 |

TABLE 3

| Example | Incident Angle | View angle of 0.5° | View angle of 1.0° | View angle of 2.0° |
|---|---|---|---|---|
| 3 | 5° | 306 | 94.7 | 16.2 |
|  | 25° | 141 | 51.4 | 13.5 |
|  | 45° | 75.8 | 35.2 | 13.5 |
|  | 65° | 21.6 | 18.9 |  |
| 4 | 5° | 394 | 45.2 | 8.49 |
|  | 25° | 283 | 53.7 | 11.3 |
|  | 45° | 161 | 59.4 | 11.3 |
|  | 65° | 36.8 | 28.3 | 8.49 |

Various modifications and alterations of this invention will become apparent to those skilled in the art without departing from the scope and spirit of this invention.

What is claimed is:

1. An electroluminescent retroreflective article comprising:

(a) a retroreflective member comprising (1) a cube corner member having a front surface and a back surface, said back surface having a plurality of cube corner elements protruding therefrom and (2) a seal film bonded to selected portions of said back surface and having a first surface oriented toward said cube corner elements and a second surface oriented away from said cube corner elements, said film sealed to said selected portions of said back surface of said cube corner member in a pattern of interconnecting bonds so as to occupy 10 to 85% of the whole back surface of the cube corner member to define a plurality of sealed cells; and (b) an electroluminescent element bonded to said second surface of said seal film.

2. A self-luminescent retroreflective sign comprising the article of claim 1 adhered to a substrate, further comprising a graphic indicia on the front of said article.

3. The electroluminescent retroreflective article of claim 1, wherein the electroluminescent element comprises a front electrode, a light-emitting layer, an insulating layer and a back electrode.

4. The electroluminescent retroreflective article of claim 1, wherein the front electrode further comprises a transparent film and the electroluminescent element is adhered to the back side of the seal film with an intermediate adhesive.

* * * * *

UNITED STATES PATENT AND TRADEMARK OFFICE
CERTIFICATE OF CORRECTION

PATENT NO. : 6,142,643
DATED : November 7, 2000
INVENTOR(S) : Yoshinori Araki and Hidetoshi Abe It is certified that error appears in the above-identified patent and that said Letters Patent is hereby corrected as shown below:

Title page,
Add the reference listed below:
--             U.S. PATENT DOCUMENTS
3,012,164 a    12/1959     Franzone et al.     313/108
4,208,090      06/1980     Heenan              350/350 --

--             FOREIGN PATENT DOCUMENTS
WO 94/21094    09/1994     PCT                 H05B/G02F --

Column 2,
Line 36, "show" should read -- shown --.

Column 5,
Line 1, "suitable a" should read -- a suitable --.

Column 9,
Line 33, please insert -- 10.8 -- in Table 3, column entitled "View angle of 2.0°, line 4.

Signed and Sealed this

Ninth Day of July, 2002

Attest:

Attesting Officer

JAMES E. ROGAN
Director of the United States Patent and Trademark Office